United States Patent
Marinucci et al.

(10) Patent No.: US 11,449,516 B2
(45) Date of Patent: Sep. 20, 2022

(54) RANKING OF DOCUMENTS BELONGING TO DIFFERENT DOMAINS BASED ON COMPARISON OF DESCRIPTORS THEREOF

(71) Applicant: International Business Machines Corporation, Armonk, NY (US)

(72) Inventors: Francesco Marinucci, Rome (IT); Aldo Bucossi, Rome (IT); Lucia Santucci, Rome (IT); Matteo Rogante, Rome (IT); Luigi Alessandro Savorana, Rome (IT)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 17/089,115

(22) Filed: Nov. 4, 2020

(65) Prior Publication Data
US 2022/0138208 A1    May 5, 2022

(51) Int. Cl.
*G06F 16/2457* (2019.01)
*G06F 16/248* (2019.01)
*G06F 16/22* (2019.01)
*G06F 16/93* (2019.01)

(52) U.S. Cl.
CPC .... *G06F 16/24578* (2019.01); *G06F 16/2228* (2019.01); *G06F 16/248* (2019.01); *G06F 16/93* (2019.01)

(58) Field of Classification Search
None
See application file for complete search history.

(56) References Cited

U.S. PATENT DOCUMENTS

| | | | |
|---|---|---|---|
| 7,206,965 B2 | 4/2007 | Roddy | |
| 7,287,012 B2 | 10/2007 | Corston | |
| 8,260,773 B2 | 9/2012 | Jennings, III | |
| 10,223,329 B2 * | 3/2019 | Baset | G06F 16/248 |
| 2011/0264699 A1 * | 10/2011 | Antonelli | G06F 16/353 |
| | | | 707/777 |
| 2012/0210301 A1 * | 8/2012 | Crisp | G06F 8/36 |
| | | | 717/120 |
| 2014/0304267 A1 | 10/2014 | Deng | |
| 2016/0110428 A1 | 4/2016 | Vasenkov | |
| 2016/0306873 A1 | 10/2016 | Wang | |
| 2016/0342500 A1 * | 11/2016 | Boia | G06F 11/3688 |
| 2016/0378769 A1 * | 12/2016 | Hopcroft | G06F 16/325 |
| | | | 707/730 |
| 2016/0378796 A1 * | 12/2016 | Hopcroft | G06F 16/316 |
| | | | 707/692 |
| 2016/0378804 A1 * | 12/2016 | Hopcroft | G06F 16/2237 |
| | | | 707/715 |

(Continued)

*Primary Examiner* — Kim T Nguyen
(74) *Attorney, Agent, or Firm* — Edward P. Li

(57) ABSTRACT

A solution is proposed for ranking documents belonging to two different domains. A corresponding method comprises generating a descriptor for each of the documents; the descriptor comprises corresponding values and confidence indexes of multiple properties (of the corresponding document); the documents of a domain are ranked with respect to a document of another domain according to a comparison of their descriptors. A computer program product for performing the method are also proposed. Moreover, a computing system for implementing the method is proposed.

15 Claims, 8 Drawing Sheets

(56) References Cited

U.S. PATENT DOCUMENTS

| | | | |
|---|---|---|---|
| 2016/0378806 A1* | 12/2016 | Hopcroft | G06F 16/93 |
| | | | 707/715 |
| 2016/0378807 A1* | 12/2016 | Hopcroft | G06F 16/2272 |
| | | | 707/715 |
| 2018/0032930 A1* | 2/2018 | Kolb | G06F 40/253 |
| 2018/0293242 A1* | 10/2018 | Shishkin | G06F 16/3347 |
| 2019/0213407 A1 | 7/2019 | Toivanen | |
| 2019/0272328 A1* | 9/2019 | Dubyak | G06F 40/40 |
| 2019/0272382 A1* | 9/2019 | Dubyak | G06F 40/30 |
| 2020/0252518 A1* | 8/2020 | Takano | G06F 3/0481 |

* cited by examiner

RANKING OF DOCUMENTS BELONGING TO DIFFERENT DOMAINS BASED ON COMPARISON OF DESCRIPTORS THEREOF

BACKGROUND

The present invention relates generally to the information technology field, and more particularly to ranking of documents.

Ranking of documents is a commonplace activity in computing systems. For example, when starting from certain documents such as problem documents describing problems, other documents such as (solution) documents describing possible solutions to the problems are to be found. When the (problem/solution) documents are unstructured (such as in natural language), it is not possible to prove mathematically that any solution document is more relevant than another one for a certain problem document. Therefore, the selection of the solution documents that best match the problem documents is an empiric task. Therefore, the ranking of the solution documents is used to estimate their relevance and to order or sort the solution documents accordingly; this significantly facilitates the identification of the solution documents that are actually of interest. A typical example is in Asset Reuse (AR) applications, where the documents are made available to facilitate finding solutions to similar problems already occurred in the past.

In general, ranking of documents is applied to a corpus (or collection) of documents, which is formed by a large number of documents. In the example at issue, when a user needs to find a solution to a specific problem, the user submits a corresponding search request by selecting a problem document that describes the problem, for example, by accessing an asset reuse manager running on a remote server with a client thereof. The asset reuse manager calculates a similarity index of each solution document with respect to the problem document. The solution documents are then ranked according to their similarity indexes, for example, by returning a list of the most relevant solution documents in decreasing order of their similarity indexes to the client.

Different ranking techniques may be used to calculate the similarity indexes of the solution documents with respect to any problem document. Particularly, most ranking techniques are based on a bag-of-words approach, where words composing the problem document are compared with words composing each solution documents. For example, a widespread ranking technique is based on the Vector Space Model (VSM), where the solution documents are ranked with respect to the problem document according to their words and occurrences thereof; in this case, the similarity index of each solution document with respect to the problem document depends on the words that are common, giving more significance to the words that are repeated and/or are rare. Other ranking techniques are instead based on a probability model, where the solution documents are ranked according to the probability that they will be relevant for any problem document. For example, the similarity index of each solution document with respect to the problem document may depend on the users who have chosen the solution document and considered the solution document relevant with respect to all the users who have chose the solution document.

The quality of any ranking technique depends on how well it is capable of selecting the solution documents (identified by the topmost ranked ones) that are actually relevant. For example, a precision (defined by the relevant solution documents that are selected with respect to the total number of selected solution documents) should be as high as possible; it is desirable to limit (irrelevant) solution documents that are not of interest, i.e., false positive results (selecting no irrelevant solution documents ideally). At the same time, a recall (defined by the relevant solution documents that are selected with respect to the total number of the relevant solution documents) should be as high as possible; it is desirable to limit the relevant solution documents that are not selected, i.e., false negative results (selecting all the relevant solution documents ideally). More simply, a ranking technique should be capable of selecting some relevant solution documents; for example, this is the case when the ranking technique is applied to a browsing paradigm, based on a quick examination of the relevance of the selected solution documents that may or may not lead to a deeper examination thereof; indeed, in this context the precision and the recall may be less important, provided that at least some of the selected solution documents are relevant.

A low quality of the ranking may adversely affect the performance of the corresponding computing system. Particularly, low precision and recall or simply low probability of selecting some relevant solution documents may require the submission of one or more additional search requests for finding the solution documents that are actually of interest. These additional search requests involve a corresponding additional consumption of resources of the computing system, for example, computational power for serving the additional search requests, network traffic for submitting the additional search requests and returning their results.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of comparing descriptors of the documents.

Particularly, an embodiment provides a computer-implemented method for ranking documents belonging to two different domains. The method comprises generating a descriptor for each of the documents; the descriptor comprises corresponding values and confidence indexes of multiple properties of the corresponding document; the documents of a domain are ranked with respect to a document of another domain according to a comparison of their descriptors.

A further aspect provides a corresponding computer program product.

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE SEVERAL VIEWS OF THE DRAWINGS

The solution of the present disclosure, as well as further features and the advantages thereof, will be best understood with reference to the following detailed description thereof, given purely by way of a non-restrictive indication, to be read in conjunction with the accompanying drawings. For the sake of simplicity, corresponding elements are denoted with equal or similar references and their explanation is not repeated, and the name of each entity is generally used to denote both its type and its properties, like value, content and representation.

DETAILED DESCRIPTION

With reference in particular to FIG. 1A-FIG. 1D, the general principles are shown of the solution according to an embodiment of the present disclosure.

Figure 1A:
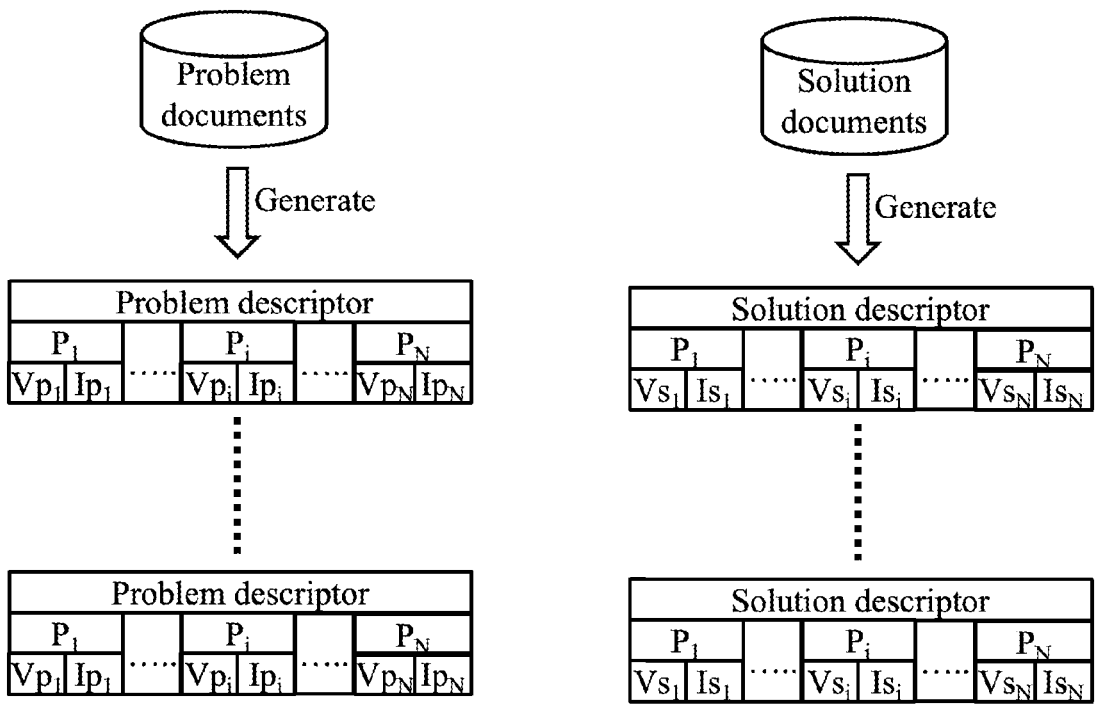
FIG. 1A-FIG. 1D show the general principles of the solution, according to an embodiment of the present disclosure.

Referring to FIG. 1A, a corpus of documents is stored in one or more storage devices (for example, in the Internet). The documents belong to two different domains; for example, in an asset reuse application (problem) documents describe problems occurred in the past and a (solution) documents describe possible solutions to the problems. The solution documents are ranked according to their relevance with respect to each problem document. For example, when a user needs to find a solution to a specific problem, the user selects a corresponding (selected) problem document that describes it; the selected problem document may be chosen by submitting a corresponding search request to a server running an asset reuse manager by the user via a client thereof. In any case, the following operations are performed to rank the solution documents according to their relevance with respect to each (selected) problem document. These operations are executed under the control of a computing system (the server in the example at issue). Indeed, the operations are completely unsuitable for a human being, since this would require reading of all the solution documents of the corpus (normally in a very high number, for example, of the order of billions); therefore, the time spent by a human being to do so would be so huge to make it absolutely impractical. Conversely, reading of all the solution documents of the corpus is exactly what their ranking is aimed at avoiding; as a matter of fact, the purpose of this process is to identify the solution documents that are supposed to be the most relevant automatically among their high number in the corpus, so as to allow the manual selection of the ones that are actually of interest in a relatively short time.

In the solution according to an embodiment of the present disclosure, corresponding (problem) descriptors are generated for the problem documents and corresponding (solution) descriptors are generated for the solution documents. Each (problem or solution) descriptor contains information relating to a plurality of properties; each property represents a characteristic of the corresponding (problem or solution) document, which may have different (property) values (for example, the property "activity" that may have the values "install", "upgrade", "run", "configure", and so on). Particularly, for each i-th property $P_i$ (i=1, ..., N), the descriptor contains its value in the corresponding document (denoted as $Vp_i$ in the problem descriptors and $Vs_i$ in the solution descriptors) and a confidence index (denoted as $Ip_i$ in the problem descriptors and $Is_i$ in the solution descriptors) that measures how much the value of the property characterizes the document. The solution documents are then ranked with respect to each (selected) problem document according to a comparison of the solutions descriptors with the corresponding (selected) problem descriptor.

Figure 1B:
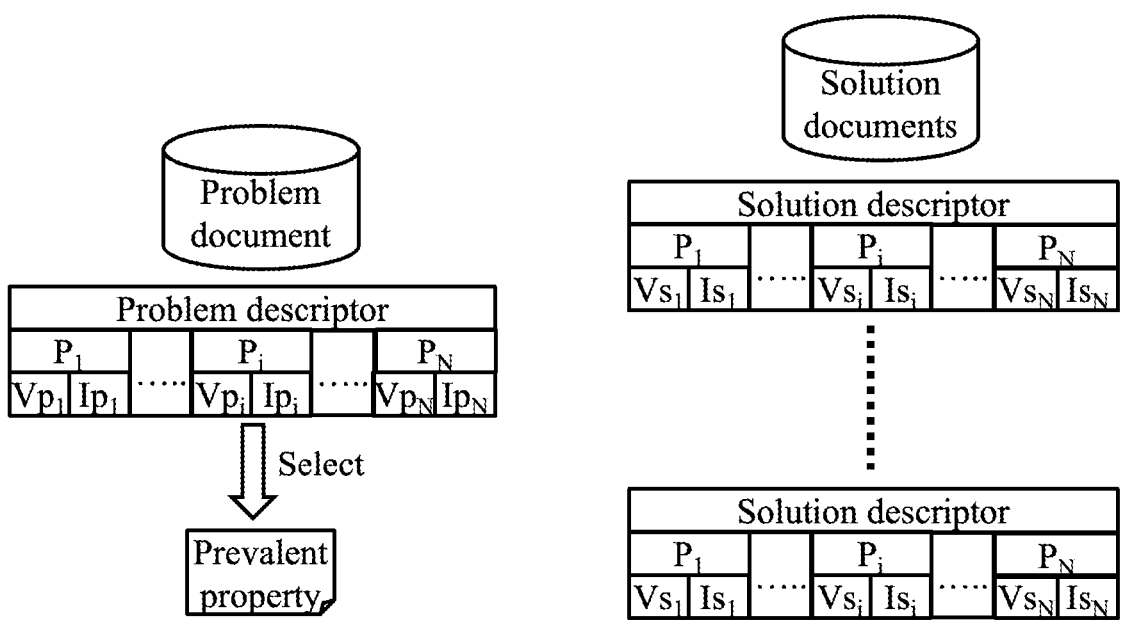

Referring to FIG. 1B, in a specific implementation, a prevalent property (or more) is selected among all the properties $p_i$, as one that best characterizes the problem document. Particularly, the prevalent property is selected according to the confidence indexes $Ip_i$ of the properties $P_i$ in the corresponding problem descriptor (for example, the one with the highest confidence index $Ip_i$).

Figure 1C:
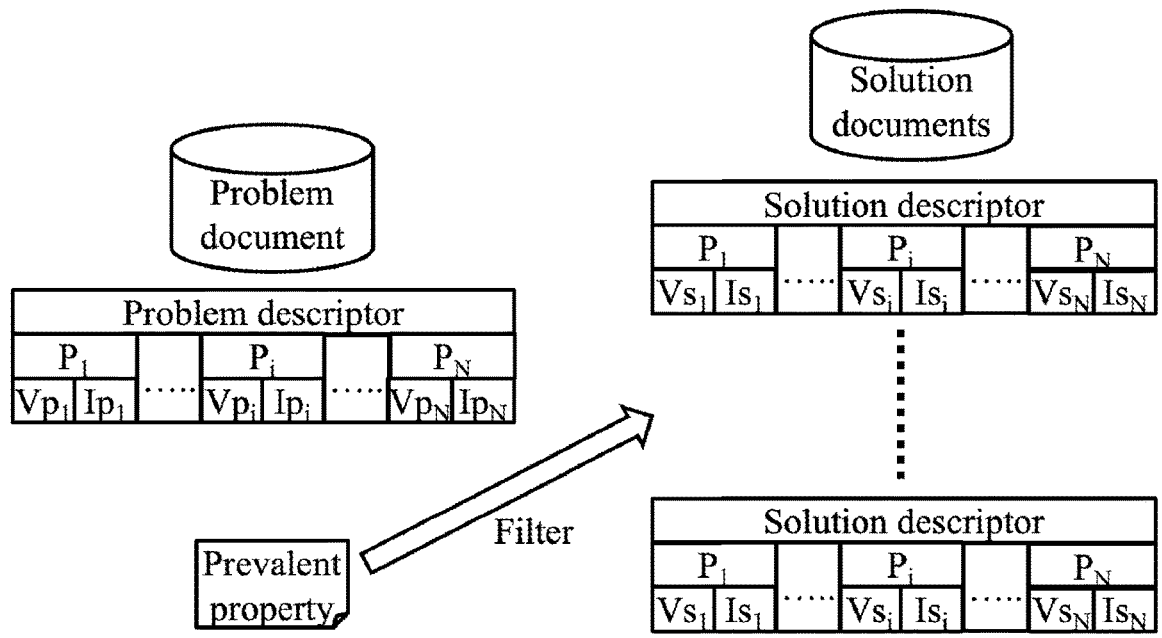

Referring to FIG. 1C, the solution documents are filtered so as to identify one or more (candidate) solution documents thereof that are candidate to be relevant for the problem document. Particularly, the candidate solution documents are identified according to a matching of the values of the prevalent property in the solution descriptors with the value of the prevalent property in the problem descriptor (for example, by taking into account only the solution documents for which the values of the prevalent property in their solution descriptors are equal to the value of the prevalent property in the problem descriptor).

Figure 1D:
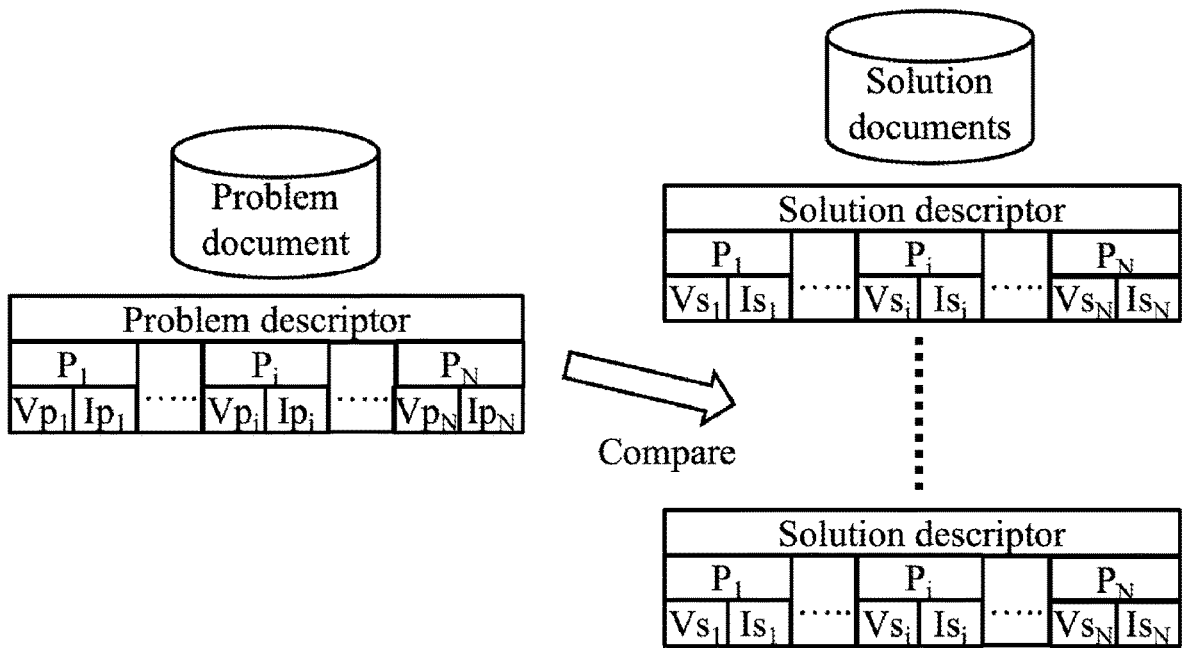

Referring to FIG. 1D, corresponding relevance indexes are calculated for the candidate solution documents; the relevance indexes measure a relevance of the candidate solution documents with respect to the problem document. Particularly, the relevance index of each candidate solution document is calculated according to a matching of the value of each property in the solution descriptor of the candidate solution document with the value of the same property in the problem descriptor, weighted according to the corresponding confidence indexes (for example, by summing an average of the confidence indexes of the properties having the same values in both the solution descriptor and the problem descriptor). An indication of the candidate solution documents (or at least part thereof) ranked according to the corresponding relevance indexes is then output. For example, the asset reuse manager returns a list of the most relevant (candidate) solution documents (arranged in decreasing order of their relevance indexes) to the client so as to facilitate their manual selection by its user.

The above-described solution significantly increases the quality of the ranking; for example, it is possible to increase the precision (thereby limiting irrelevant solution documents that are selected), the recall (thereby limiting relevant solution documents that are not selected) or simply the probability of selecting some relevant solution documents (for their browsing). Indeed, the descriptors categorize the documents in a structured way (by their values of the properties); this is based on a cognitive approach, which acts at the level of each property individually, so as to provide corresponding different signatures of the documents. Moreover, the use of the same properties for both the domain of the problem documents and the domain of the solution documents makes the documents of the two different domains homogeneous and then comparable.

This result may be achieved in a very simple way; particularly, at least the solution descriptors (characterizing the solution documents independently of the problem documents) may be determined off-line; therefore, the impact of the proposed solution on run-time performance (for example, a response time of any search request) is negligible in practice.

All of the above significantly improves the performance of the corresponding computing system. Particularly, the resulting increased precision and recall or simply increased probability of selecting some relevant solution documents reduce the need of performing additional searches for finding the solution documents that are actually of interest. This involves a corresponding reduction of consumption of resources of the computing system; for example, computational power of the server is saved (since no or at least reduced additional search requests are to be served) and network traffic is reduced (since no or at least reduced additional search requests are received by the server and their results are returned to the client).

Figure 2:
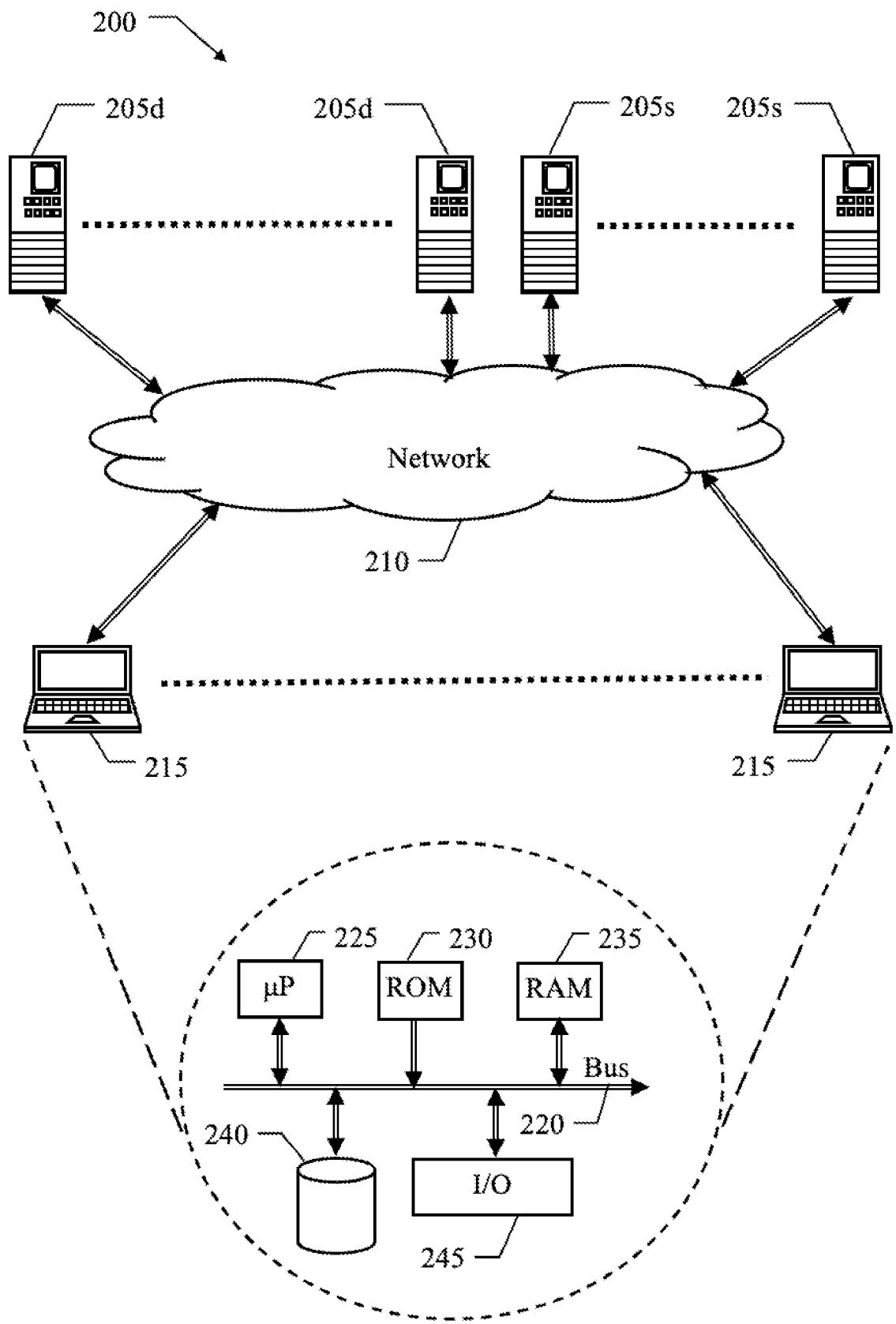
FIG. 2 shows a schematic block diagram of a computing infrastructure wherein the solution may be practiced, according to an embodiment of the present disclosure.

With reference now to FIG. 2, a schematic block diagram is shown for a computing infrastructure 200 where the solution may be practiced, according to an embodiment of the present disclosure.

The computing infrastructure 200 has a distributed architecture, typically based on the Internet. The Internet is formed by millions of server computing systems, or simply servers; particularly, one or more (document) servers 205d store (problem/solution) documents available in the Internet, whereas one or more (search) servers 205s run asset reuse managers designed to search the solution documents best matching the problem documents. The servers 205d and 205s are inter-connected through a (telecommunication) network 210 of global type. Users of client computing machines, or simply clients 215 access the Internet in order to exploit the services offered by it; particularly, as far as relevant to the present disclosure, the users of the clients 215 access the search servers 205s to search solution documents of interest for corresponding problem documents, which may then be downloaded from the corresponding document servers 205d.

Each of the above-described computing machines (i.e., the document/search servers 250d and 205s and the clients 215) comprises several units that are connected among them through a bus structure 220 with one or more levels (with an architecture that is suitably scaled according to the type of the servers 205d and 205s and the clients 215). Particularly, one or more microprocessors (μP) 225 provide a logic capability of the servers 205d and 205s and the clients 215; a non-volatile memory (ROM) 230 stores basic code for a bootstrap of the servers 205d and 205s and the clients 215, and a volatile memory (RAM) 235 is used as a working memory by the microprocessors 225. The servers 205d and 205s and the clients 215 are provided with a mass-memory 240 for storing programs and data (for example, storage devices of corresponding data centers wherein the servers 250d and 205s are implemented or hard-disks for the clients 215). Moreover, the servers 250d and 205s and the clients 215 comprise a number of controllers for peripherals (or Input/Output (I/O) units) 245; for example, the peripherals of each of the servers 205d and 205s comprise a network adapter (NIC) for plugging the of the servers 205d and 205s into the corresponding data center and then connecting it to a console of the data center for its control (for example, a personal computer, also provided with a drive for reading/writing removable storage units, such as of USB type) and to a switch/router sub-system of the data center for its communication with the network 210, whereas the peripherals 245 of each of clients 215 comprise a keyboard, a mouse, a monitor, a network adapter for connecting to the network 210 and a drive for reading/writing removable storage units (such as of USB type).

Figure 3:
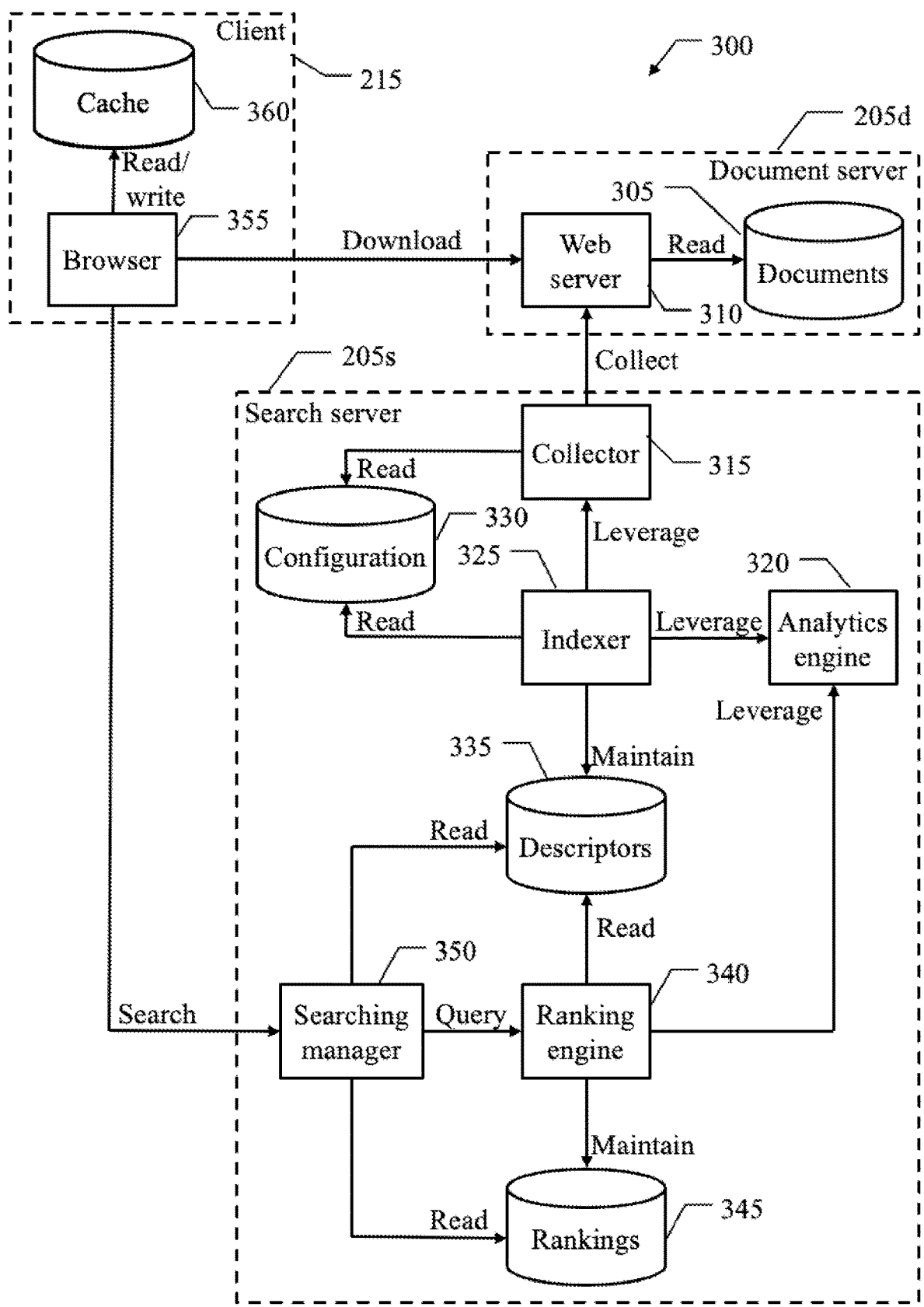
FIG. 3 shows the main software components that may be used to implement the solution, according to an embodiment of the present disclosure.

With reference now to FIG. 3, the main software components are shown that may be used to implement the solution, according to an embodiment of the present disclosure.

Particularly, all the software components (programs and data) are denoted as a whole with the reference 300. The software components 300 are typically stored in the mass memory and loaded (at least partially) into the working memory of each of the servers 250d and 205s and the clients 215 when the programs are running, together with an operating system and other application programs (not shown in the figure). The programs are initially installed into the mass memory, for example, from removable storage units or from the network. In this respect, each program may be a module, segment or portion of code, which comprises one or more executable instructions for implementing the specified logical function.

Starting from each document server 205d (only one shown in the figure), it comprises the following software components.

One or more (problem/solution) documents 305 being available in the Internet are stored in the document server 205d; for example, the documents 305 contain text, images, videos and so on. The documents 305 may be problem documents 305 relating to problems (i.e., situations needing to be changed) or solution documents 305 relating to solutions (i.e., activities expected to remove the problems). Particularly, in (asset) reuse applications the documents 305 are searched to find similar situations already occurred in the past; in this case, some of the documents 305 represent occurred problems and some of the documents 305 represent possible solutions thereof. Conversely, in interrogation applications the documents 305 are searched to find information relating to contingent needs; in this case, the documents 305 represents solutions to any problems that are expressed in queries used to search them. A web server 310 manages any requests submitted to the document server 205d, in particular for accessing the documents 305. For this purpose, the web server 310 reads the documents 305.

Moving to each search server 205s (only one shown in the figure), it comprises the following software components.

A collector 315 (for example, implemented by a web crawler, or spider) collects information about the corpus of documents 305 stored in all the document servers 205d via their web servers 310. An analytics engine 320 applies text analysis techniques to the documents 305 (in raw and unstructured form) to extract semantic information defining their meaning. A commercial example of the analytics engine 320 is IBM Content Classification by IBM Corporation (trademarks thereof). An indexer 325 indexes the documents 305 for their ranking. The indexer 325 leverages the collector 315 and the analytics engine 320. A configuration repository 330 contains configuration information for collecting/indexing the documents 305. For example, the configuration repository 330 comprises one or more entries for corresponding search contexts (for example, technical fields, such as "information technology", "electronics" and the like, "medicine", "education", "finance", "tourism" and so on). The entry stores a description of the search context in natural language and collection information for collecting the documents relating thereto, such as identifiers of one or more corresponding document servers 205d (for example, their Uniform Resource Locators, URLs) and/or corresponding keywords (being omitted when a single search context is supported); moreover, the entry stores an indication of multiple properties to be used for ranking the corresponding documents (for example, "operating system", "product", "activity", "error" and the like in the search context of "information technology", "symptoms", "signs", "pathologies", "habits", "age" and the like in the search context of "medicine" and so on). Both the collector 315 and the indexer 325 read the configuration repository 330. The indexer 325 maintains a descriptor repository 335. The descriptor repository 335 has a section for each search context, which section contains the (problem or solution) descriptors of the corresponding (problem or solution) documents 305; particularly, in reuse applications the section comprises both problem descriptors of problem documents 305 (for example, tickets) and solution descriptors of solution documents 305 (for example, manuals), whereas in interrogation applications the section comprises solution descriptors of solution documents 305 only (for example, again manuals). Each descriptor stores an identifier of the corresponding document 305 for accessing it in the document server 205d where it is stored (for example, its URL). Moreover, the descriptor has an entry for each property of the corresponding search context (for example, identified by its position in a corresponding array); the entry stores the value of the property in the document 305 (and possibly a sentence in the document 305 where this value has been retrieved) and a confidence index measuring a confidence that the property has this value in the document 305 (for example, ranging from 0 to 1 in increasing order of confidence). In case of a solution descriptor, the entry further stores an effectiveness index measuring an effectiveness of the solution document to solve the problems for which it has been selected (for example, ranging from 0 to 1 in increasing order of effectiveness); the effectiveness index may be calculated according to a percentage of the number of times the solution document 305 has solved the problem for which it has been selected with respect to the total number of times the solution document 305 has been selected in the search requests. A ranking engine 340 is used to rank the solution documents 305 for their search; for this purpose, the ranking engine 340 calculates a relevance index of each solution document 305 with respect to each problem document, which relevance index measures an (estimated) relevance of the solution document 305 with respect to the problem document (for example, ranging from 0 to 1 in increasing order of relevance). Particularly, in reuse applications the ranking engine 340 may rank the solution documents 305 either dynamically, by calculating the relevance indexes of the solution documents 305 with respect to the corresponding (selected) problem document in response to each search request (to reduce storage occupation), or statically, by calculating the relevance indexes of the solution documents 305 with respect to each problem document in advance (to reduce response time). In interrogation applications, instead, the ranking engine 340 ranks the solution documents 305 dynamically, by calculating the relevance indexes of the solution documents 305 with respect to the corresponding (selected) problem document in response to each search request. When the documents 305 are ranked dynamically (either in reuse applications or in interrogation applications), the ranking engine 340 reads the descriptor repository 335 and leverages the analytics engine 320. When the documents 305 are ranked statically (in reuse applications), the ranking engine 340 further maintains a ranking repository 345, which defines the ranking of the solution documents 305 with respect to the problem documents 305. For example, the ranking repository 345 contains an entry for each problem document 305 (as indicated by its identifier); the entry stores the identifiers of the most relevant solution documents 305 for the problem document 305 (such as the first 50-100), together with the corresponding relevance indexes. A searching manager 350 is used to search the solution documents 305. In reuse applications, the searching manager 350 (for example, implemented by an asset reuse manager) reads the document descriptor repository 335 and it may either query the ranking engine 340 (to rank the solution documents 305 dynamically) or read the ranking repository 345 (to retrieve the pre-determined ranking of the solution documents 305). In interrogation applications, instead, the searching manager 350 (for example, implemented by a search engine) queries the ranking engine 340 (to rank the solution documents 305 dynamically).

Each client 215 (only one shown in the figure) comprises the following software components. A (web) browser 355 is used to surf the Internet. As far as relevant to the present disclosure, the browser 355 communicates with the searching manager 350 for searching the solution documents 305. Particularly, in reuse applications the user of the client 215 selects the problem documents 305 via the browser 355, either directly or by submitting corresponding queries for selecting them; each query contains information, which is defined by a sentence that the user deems adapted to identifying the content of the problem document 305 that is of interest. In interrogation applications, instead, the user of the client 215 submits similar queries via the browser 355; each query contains a sentence defining a corresponding problem document. Moreover, the browser 355 communicates with the document servers 205d for downloading the solution documents 305 that are selected in response to the search requests. The browser 355 reads/writes a cache memory 360, which stores the solution documents 305 that have been downloaded temporary (which solution documents 305 may also be saved in the mass memory of the client 215 if desired).

Referring to FIG. 4A, FIG. 4B, FIG. 5A, and FIG. 5B that show corresponding activity diagrams describing the flow of activities relating to an implementation of the solution, according to an embodiment of the present disclosure. In this respect, each block may correspond to one or more executable instructions for implementing the specified logical function on a generic search server.

Figure 4A:
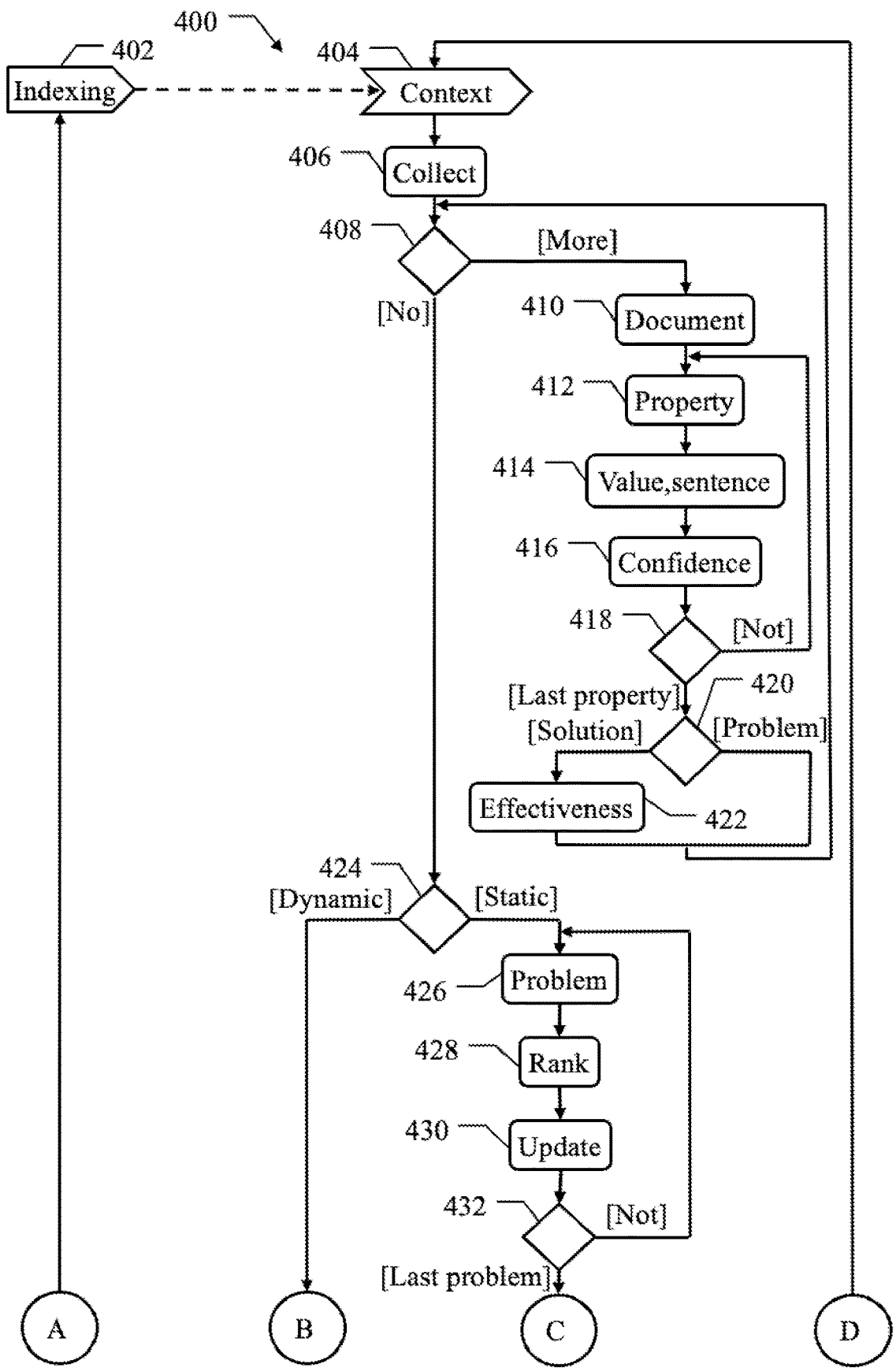
FIG. 4A, FIG. 4B, FIG. 5A, and FIG. 5B show corresponding activity diagrams describing the flow of activities relating to an implementation of the solution, according to an embodiment of the present disclosure.
Figure 4B:
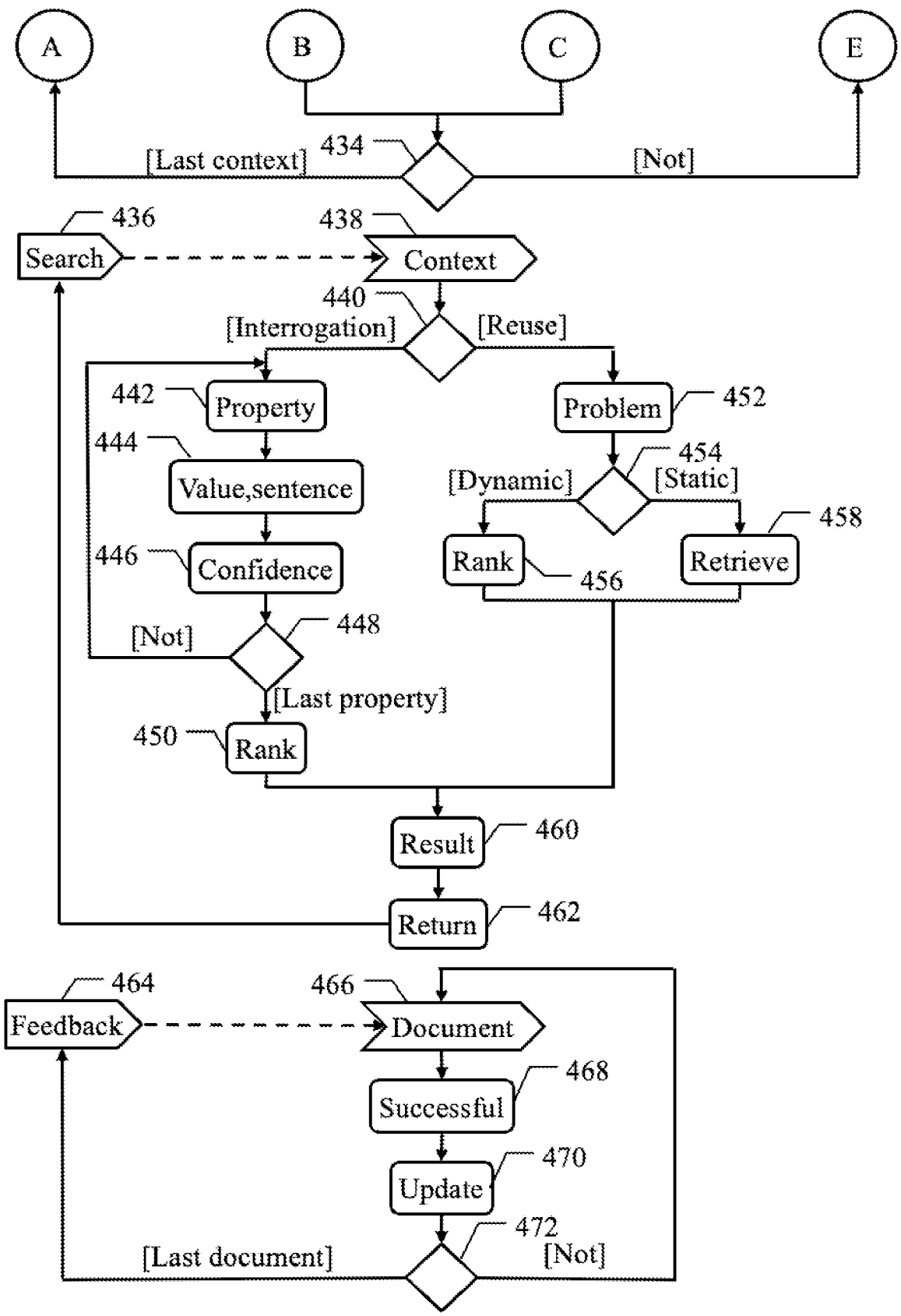

Particularly, the diagrams of FIG. 4A and FIG. 4B represent an exemplary process that may be used to search the solution documents with a method 400. The process passes from block 402 to block 404 as soon as an (indexing) event occurs triggering the indexing of the documents. For example, this may happen periodically (such as every night), whenever the documents are updated or upon request. At this point, a loop is entered by the indexer that takes a (current) search context into account (starting from a first one in any arbitrary order as indicated in the configuration repository), this step being omitted in case a single search context is supported. The collector at block 406 determines any (new) documents relating to the search context that have been updated since a last indexing (by exploiting the corresponding collection information retrieved from the configuration repository); particularly, the documents represent problems/solutions in reuse applications and solutions in interrogations applications. The indexer at block 408 verifies whether any of these documents is still to be processed. If so, the indexer at block 410 takes a (current) document into account (starting from a first one in any arbitrary order), and it adds a new descriptor thereof with its identifier to the descriptor repository. A loop is entered at block 412, wherein the indexer takes a (current) property of the search context into account (starting from a first one in any arbitrary order as indicated in the configuration repository). The analytics engine at block 414 determines the value of the property in the document and the corresponding sentence (with the indexer that updates the descriptor of the document in the corresponding repository accordingly). At the same time, the analytics engine at block 416 determines the confidence index of the value of the property in the document (with the indexer that updates its descriptor in the corresponding repository accordingly). The indexer at block 418 verifies whether a last property has been processed. If not, the flow of activity returns to the block 412 to repeat the same operations on a next property. Conversely (once all the properties have been processed), the loop is exit by descending into block 420. The process now branches according to the type of document. In case of a problem document, the flow of activity returns to the block 408 directly. Conversely, in case of a solution document, the indexer at block 422 initializes the effectiveness index of its descriptor to 0 in the corresponding repository. The process then returns to the block 408. Referring back to the block 408, as soon as no document remains to be processed (always true when no document has been collected), the loop is exit by descending into block 424.

The flow of activity new branches according to the type of application. When the documents are ranked statically (in reuse applications), a loop is entered at block 426 wherein the ranking engine takes a (current) problem document into account (starting from a first one in any arbitrary order). The ranking engine at block 428 ranks the solution documents with respect to the problem document, so as to obtain a list with the identifiers of the most relevant solution documents for the problem document together with the corresponding relevance indexes (as described in detail the following). The ranking engine at block 430 updates the ranking repository accordingly. The ranking engine at block 432 verifies whether a last problem document has been processed. If not, the flow of activity returns to the block 426 to repeat the same operations on a next problem document. Conversely (once all the problem documents have been processed), the loop is exit by descending into block 434; the same point is also reached directly from the block 424 when the documents are ranked dynamically (always true in interrogation applications). At this point, the indexer verifies whether a last search context has been processed. If not, the flow of activity returns to the block 404 to repeat the same operations on a next search context. Conversely (once all the search contexts have been processed), the loop is exit and the flow of activity returns to the block 402 waiting for a next indexing event.

In a completely independent way, the process passes from block 436 to block 438 whenever the searching manager receives a search request from any client. In response thereto, the searching manager determines the search context of the search request (this step being omitted in case a single search context is supported); for example, the search context is indicated in the search request (such as following its manual selection by the user of the client or set automatically by a corresponding program used to submit the search request), it is determined automatically by the analytics engine according to the search request and so on. The flow of activity then branches at block 440 according to the type of application. Particularly, in interrogation applications the blocks 442-450 are executed, whereas in reuse applications the blocks 452-458 are executed; in both cases, the method then joints again at block 460.

Considering now block 442 (interrogation applications), the indexer generates the (selected) problem descriptor of the (selected) problem document defined by a query contained in the search request as above. Briefly, a loop is entered wherein the indexer takes a (current) property of the search context into account (starting from a first one in any arbitrary order as indicated in the configuration repository). The analytics engine at block 444 determines the value of the property in the problem document and the corresponding sentence (with the indexer that updates the problem descriptor accordingly). At the same time, the analytics engine at block 446 determines the confidence index of the value of the property in the problem document (with the indexer that updates the problem descriptor accordingly). The indexer at block 448 verifies whether a last property has been processed. If not, the flow of activity returns to the block 442 to repeat the same operations on a next property. Conversely (once all the properties have been processed), the loop is exit by descending into block 450. At this point, the ranking engine ranks the solution documents with respect to the problem document, so as to obtain a list with the identifiers of the most relevant solution documents for the problem document together with the corresponding relevance indexes (as described in detail the following).

Considering block 452 (reuse applications), the (selected) problem document corresponding to the search request is identified; for example, the problem document is indicated in the search request (such as following its manual selection by the user of the client) or it is determined automatically from a query contained in the search request (by generating as above its descriptor, ranking the problem documents with respect to the query as described in the following and then selecting the most relevant problem document). The flow of activity branches at block 454 according to the type of ranking. When the documents are ranked dynamically, the ranking engine at block 456 ranks the solution documents with respect to the problem document, so as to obtain a list with the identifiers of the most relevant solution documents for the problem document together with the corresponding relevance indexes (as described in detail the following). Conversely, when the documents are ranked statically, the ranking engine at block 458 retrieves the same list directly from the ranking repository. In both cases, the process then descends into the block 460.

With reference now to the block 460, the searching manager generates a (search) response for the search request; the search response contains the list of the most relevant solution documents as determined above, arranged in decreasing order of their relevance indexes. The searching manager at block 462 returns the search response to the client from which the search request has been received. The process then goes back to the block 436 waiting for a next search request. In response thereto (not shown in the figure), the browser of the client displays the list of the most relevant solution documents on the monitor of the client, so as to allow its user to browse the list from the top for selecting the solution documents that are actually of interest. The solution documents may then be examined by opening them; this involves retrieving the solution documents from the corresponding document servers over the network and storing them temporarily into the cache memory of the browser. The solution documents may then be downloaded to the mass memory of the client and possibly printed to facilitate their reading.

In a completely independent way, the process passes from block 464 to block 466 whenever the searching manager receives a (search) feedback of any search from the browser of the corresponding client. The search feedback contains an indication of an effectiveness of at least part of the solution documents to solve the problem addressed by the search request; for example, for each solution document that has been examined by the user of the client (i.e., opened and/or downloaded), the feedback contains a score thereof defined by an indicator (such as number of starts) and/or a text that may be entered manually by the user (such as individually after examining the solution document or globally during a corresponding survey). In response thereto, a loop is entered wherein the indexers takes a (current) solution document so scored into account (starting from a first one in any arbitrary order). The indexer at block 468 determines whether the scored (solution) document has been successful in solving the problem for which it has been selected according to its score; for example, the scored document is deemed successful when the indicator reaches a threshold (such as a minimum number of starts, for example 3 out of 5) and/or when the text contains a positive comment (such as determined by the analytics engine). The indexer at block 470 updates the effectiveness index of the scored document accordingly in its descriptor (in the corresponding repository). The indexer at block 472 verifies whether a last scored document has been processed. If not, the flow of activity returns to the block 466 to repeat the same operations on a next scored document. Conversely (once all the scored documents have been processed), the loop is exit by returning to block 464 waiting for a next search feedback. In this way, the effectiveness indexes of the solution documents self-adapt dynamically.

Figure 5A:
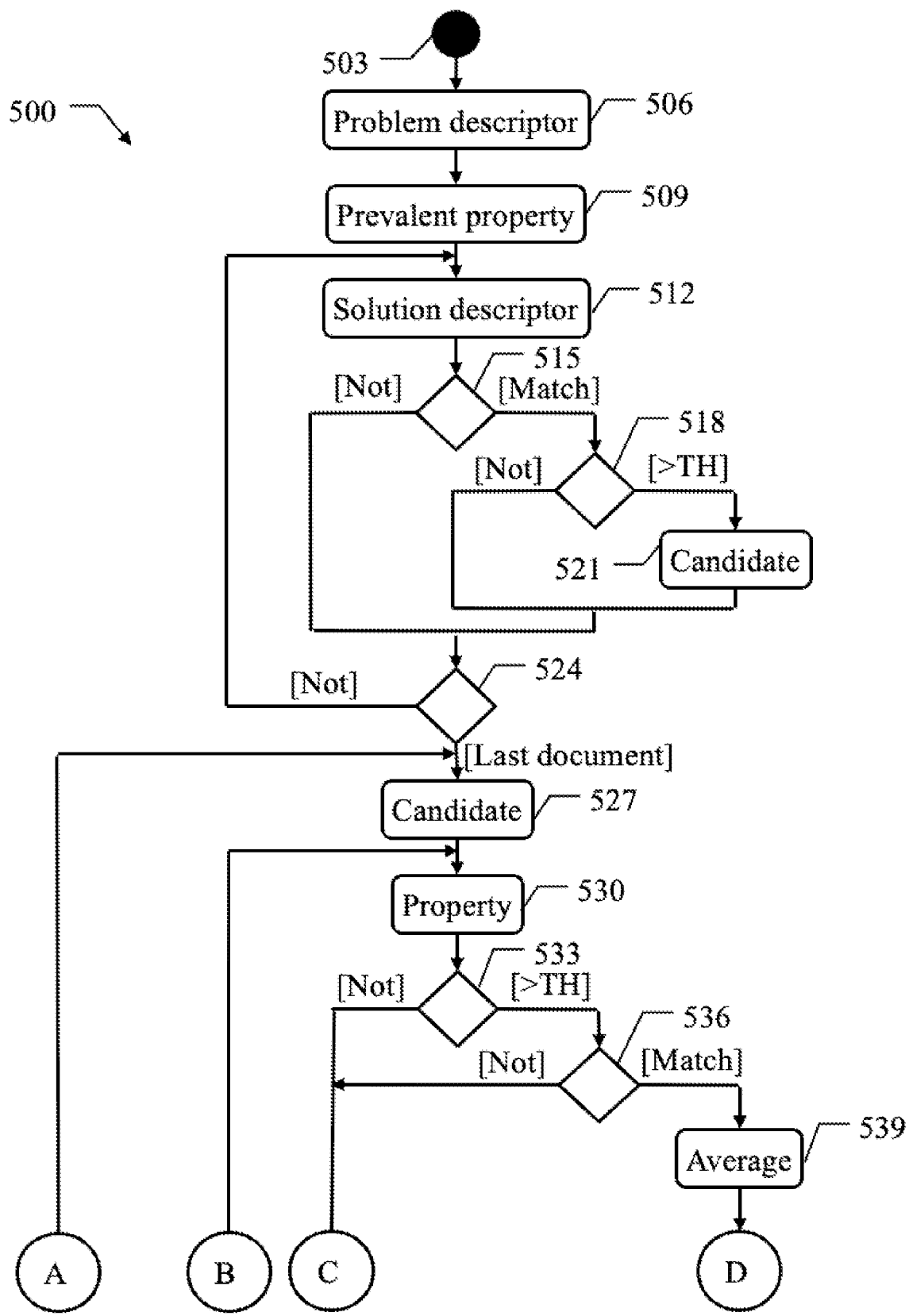
Figure 5B:
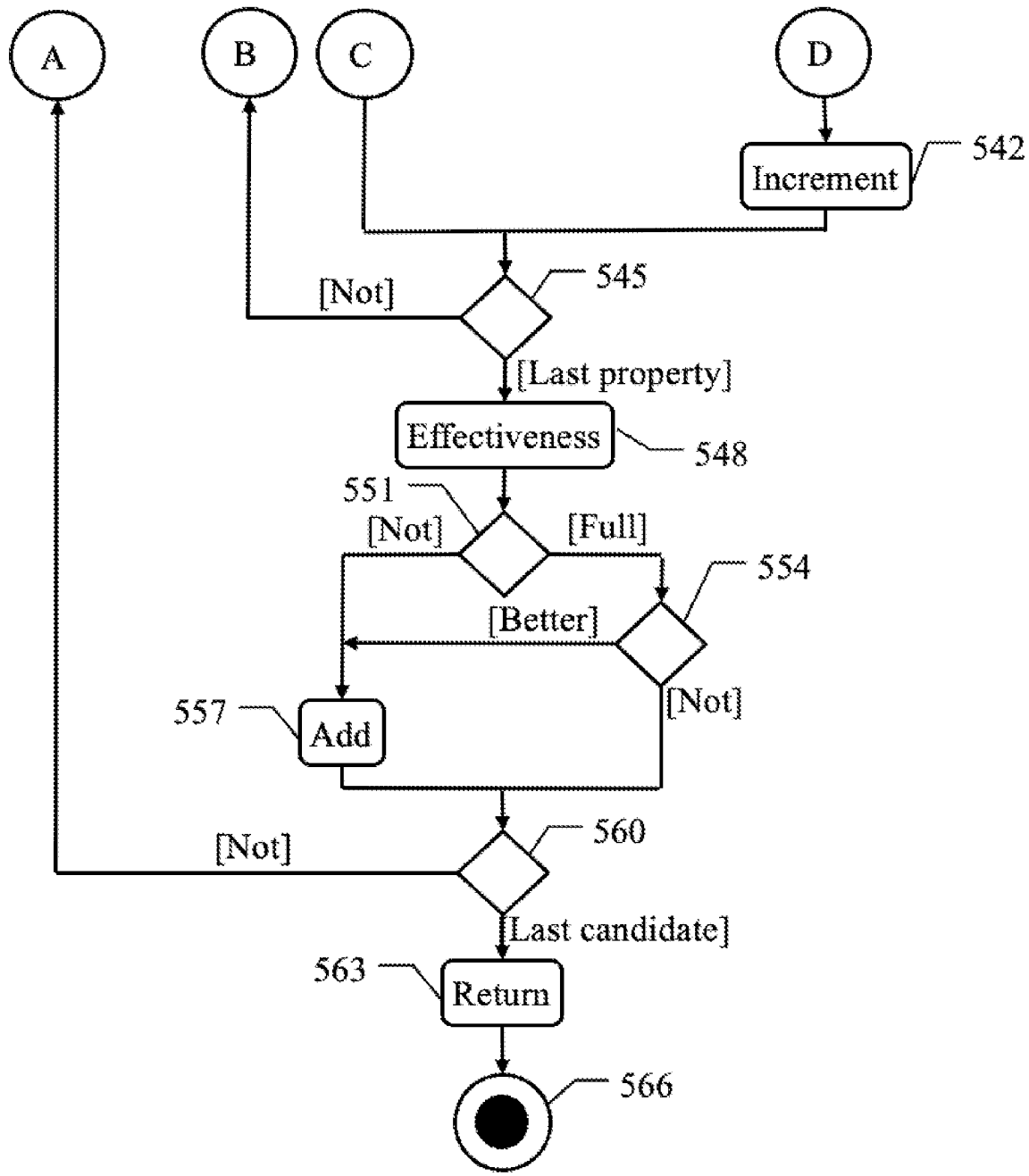

Referring to FIG. 5A-FIG. 5B, it represents an exemplary process that may be used to rank the solution documents with respect to any problem document with a method 500. The process begins at the black start circle 503 and then passes to block 506, wherein the problem descriptor of the problem document is provided (either generated at run-time or retrieved from the corresponding repository). At first, the ranking engine at block 509 selects the prevalent property of the problem descriptor; the prevalent property is the one having the highest confidence index (the first one in case of more properties with the same highest confidence index). A loop is then entered at block 512, wherein the ranking engine retrieves the solution descriptor of a (current) solution document from the corresponding repository (starting from a first one in any arbitrary order). The ranking engine at block 515 compares the values of the prevalent property in the solution descriptor and in the problem descriptor. If the values match (for example, they are the same), the ranking engine at block 518 compares the value of the prevalent property in the solution descriptor with a (filtering) threshold, for example, 0.4-0.6 or 40-60% of the value of the prevalent property in the problem descriptor. If the value of the prevalent property in the solution descriptor is (possibly strictly) higher than the filtering threshold, the ranking engine at block 521 selects the solution document as candidate to be relevant for the problem document (for example, by asserting a corresponding flag). The process then descends into block 524; the same point is also reached directly, thereby disregarding the solution document, from the block 515 if the values of the prevalent property in the solution descriptor and in the problem descriptor do not match or from the block 518 if the value of the prevalent property in the solution descriptor is, possibly strictly, lower than the filtering threshold. At this point, the ranking engine verifies whether a last solution document has been processed. If not, the flow of activity returns to the block 512 to repeat the same operations on a next solution document. Conversely (once all the solution documents have been processed), the loop is exit by descending into block 527.

A loop is now entered wherein the ranking engine takes a (current) candidate solution document into account (starting from a first one in any arbitrary order). A further loop is entered at block 530, wherein the ranking engine takes a (current) property of the search context into account (starting from a first one in any arbitrary order as indicated in the configuration repository). The ranking engine at block 533 compares the value of the property in the (candidate) solution descriptor of the candidate solution document with a (comparison) threshold, for example, 0.4-0.6 or 40-60% of the value of the prevalent property in the problem descriptor. If the value of the property in the solution descriptor is (possibly strictly) higher than the comparison threshold, the ranking engine at block 536 compares the values of the property in the solution descriptor and in the problem descriptor. If the values match (for example, they are the same), the ranking engine at block 539 sets an increment value to the average of the confidence indexes of the property in the solution descriptor and in the problem descriptor. The raking engine at block 542 increments the relevance index of the candidate solution document with respect to the problem document (initialized to 0) by the increment value. The process then descends into block 545; the same point is also reached directly from the block 533 if the value of the property in the solution descriptor is (possibly strictly) lower than the comparison threshold or from the block 536 if the values of the property in the solution descriptor and in the problem descriptor do not match. In this way, only the properties having matching values in the candidate solution document and in the problem document contribute to the relevance index, with their contribution that is weighted according to the corresponding confidence indexes. The ranking engine now verifies whether a last property has been processed. If not, the flow of activity returns to the block 430 to repeat the same operation for a next property. Conversely (once all the properties have been processed), the loop is exit by descending into block 548. At this point, the ranking engine retrieves the effectiveness index of the candidate solution document from its problem descriptor; the ranking engine then adjusts the relevance index by multiplying it by the effective index. This further improves the accuracy of the relevance index and adds dynamicity to its calculation. In the end, the ranking engine normalizes the relevance index dividing it by the number of properties. As a result, the relevance index is defined by the following formula:

$$Ir = \frac{\left[\sum_{i=1}^{N} \text{match}(Vs_i, Vp_i) \cdot avg(Is_i, Ip_i)\right] \cdot Ie}{N}$$

where Ir is the relevance index, N is the number of properties, $Vs_i$ and $Vp_i$ are the values of the i-th property in the candidate solution document and in the problem document, respectively, match( ) is a function returning the value 1 or 0 when the values $Vs_i$ and $Vp_i$ match or do not match, respectively, $Is_i$ and $Ip_i$ are the confidence indexes of the i-th property in the candidate solution document and in the problem document, respectively, avg( ) is a function returning the average of the confidence indexes $Is_i$ and $Ip_i$, and Ie is the effectiveness index of the candidate solution document.

The ranking engine at block 551 verifies a ranking result (stored in a corresponding variable); the ranking result (initially empty) lists the identifiers of the most relevant solution documents with respect to the problem document (such as the first 50-100) together with the corresponding relevance indexes (in decreasing order thereof). Particularly, if the ranking result is full, the ranking engine at block 554 compares the relevance index of the candidate solution document with the relevance indexes comprised in the ranking result. If the relevance index of the candidate solution document is (possibly strictly) higher than the lowest relevance index of a last solution document contained in the ranking result, the process continues to block 557; the same point is also reached directly from the block 551 if the ranking result is not full. In both cases, the ranking engine adds the identifier of the candidate solution document together with its relevance index to the ranking result, in the position corresponding to its relevance index (shifting the information relating to any solution documents contained in the ranking result having lower relevance indexes, with the information relating to the last one that is removed if necessary). The process then continues to block 560; the same point is also reached directly from the block 554 if the relevance index of the candidate solution document is (possibly strictly) lower than the lowest relevance index of the last solution document contained in the (full) ranking result. At this point, the ranking engine verifies whether a last candidate solution document has been processed. If not, the flow of activity returns to the block 527 to repeat the same operations on a next candidate solution document. Conversely (once all the candidate solution documents have been processed), the loop is exit by descending into block 563. The ranking engine now returns the ranking result so obtained. The process then ends at the concentric white/black stop circles 566.

For example, in a very simple scenario (in the search context of "information technology" with the properties "operating system", "product", "activity" and "error"), the following descriptors are provided as follows.

Problem descriptor of problem document:
P1="operating system", Vp1=myOS1, Ip1=0.4
P2="product", Vp2=myProd1, Ip2=0.4
P3="activity", Vp3=myAct1, Ip3=0.9
P4="error", Vp4=myErr1, Ip4=0.8
Solution descriptor of solution document DOC1:
P1="operating system", Vs1=myOS1, Is1=0.2
P2="product", Vs2=myProd1, Is2=0.4
P3="activity", Vs3=myAct1, Is3=0.3
P4="error", Vs4=myErr2, Is4=0.1
Solution descriptor of solution document DOC2:
P1="operating system", Vs1=myOS1, Is1=0.3
P2="product", Vs2=myProd1, Is2=0.4
P3="activity", Vs3=myAct2, Is3=0.4
P4="error", Vs4="myErr1, Is4=0.5
Solution descriptor of solution document DOC3:
P1="operating system", Vs1=myOS2, Is1=0.6
P2="product", Vs2=myProd2, Is2=0.4
P3="activity", Vs3=myAct1, Is3=0.8
P4="error", Vs4="myErr1, Is4=0.5

The prevalent property is then $P_3$="activity" (having the highest relevance index $Ip_2$=0.9 in the problem descriptor). Therefore, the candidate solution documents are DOC1 and DOC3 (whose solution descriptors have the same value $Vs_3$=myAct1 of the prevalent property $P_3$="activity" as in the problem descriptor).

The relevance index of the candidate solution document DOC1 is:

$$Ir = \frac{1 \cdot \frac{0.4+0.2}{2} + 1 \cdot \frac{0.4+0.4}{2} + 1 \cdot \frac{0.9+0.3}{2} + 0 \cdot \frac{0.8+0.1}{2}}{4} = 0.325,$$

and the relevance index of the candidate solution document DOC3 is:

$$Ir = \frac{0 \cdot \frac{0.4+0.6}{2} + 0 \cdot \frac{0.4+0.4}{2} + 1 \cdot \frac{0.9+0.8}{2} + 1 \cdot \frac{0.8+0.5}{2}}{4} = 0.375.$$

Therefore, the ranking result will list the solution documents DOC3, DOC1 in decreasing order of their relevance.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced even without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for ranking a plurality of documents. However, the documents may be in any number and of any type (for example, partial, different and additional types with respect to the ones mentioned above, either individually or in any combination thereof). Moreover, the documents may be ranked for any purpose (for example, in reuse and/or interrogation applications such as for searching solutions to problems, in filtering applications such as for detecting spams, and so on). Particularly, in anti-spam programs (running on either an e-mail server or an e-mail client), every e-mail that is received is verified against antispam rules. For this purpose, the anti-spam rules (second documents) are ranked with respect to the e-mail (first document); whenever the relevance index of any anti-spam rule reaches a threshold, the e-mail is identified as a spam (and then flagged accordingly for its manual verification, putting into quarantine or deletion).

In an embodiment, the method comprises the following steps under the control of a computing system. However, the computing system may be of any type (see below).

In an embodiment, the method comprises providing (by the computing system) one or more first documents of a first domain and a plurality of second documents of a second domain. However, the first/second documents may be in any number and they may relate to any domains (for example, problems/solutions, diseases/therapies, exercises/workbooks and so on); moreover, the documents may be provided in any way (for example, retrieved locally, downloaded, received in search requests, any combination thereof and so on).

In an embodiment, the method comprises generating (by the computing system) corresponding first descriptors and second descriptors according to the first documents and the second documents, respectively. However, the first/second descriptors may be of any type (for example, arrays, tables and the like, with or without additional information like an indication of the sentences contributing to define the corresponding values of the properties, and so) and they may be generated in any way (for example, in advance, such as periodically, in response to any significant change, upon request and the like, and then retrieved in response to each search request, at run-time in response to each search request, in any combination thereof and so on).

In an embodiment, each of the first descriptors and of the second descriptors comprises corresponding values being determined in the corresponding first document and second document, respectively, for a plurality of properties. However, the properties may be in any number and of any type (for example, pre-defined, determined at run-time according to the search request and so on); likewise, the values of each property may be in any number and of any type (for example, selected from a pre-defined vocabulary, in free format and so on) and they may be determined in any way (for example, with analytics, cognitive, fuzzy, artificial intelligence and the like techniques, locally or exploiting a remote service, such as Watson Knowledge Studio or Watson Natural Language Understanding service from IBM Cloud Catalog by IBM Corporation (trademarks), and so on).

In an embodiment, the descriptor comprises corresponding confidence indexes of the values. However, the confidence indexes may be of any type (for example, continuous, discrete and so on) and they may be determined in any way (either the same or different with respect to the values of the properties).

In an embodiment, the method comprises ranking (by the computing system) the second documents with respect to a selected one of the first documents according to a comparison of the corresponding second descriptors with a selected one of the first descriptors corresponding to the selected first document. However, the second documents may be ranked in any way according to this comparison (for example, by filtering candidate second documents before the comparison, by applying the comparison to all the second documents and so on) and at any moment (for example, at run-time in response to each search request, in advance, such as periodically, in response to any significant change, upon request and the like, by storing any indication of the ranking of each first document with respect to the second documents and then retrieving it in response to each search request, and so on).

In an embodiment, the method comprises outputting (by the computing system) an indication of at least part of the second documents according to the ranking. However, the second documents may be output in any way according to their ranking (for example, selecting the most relevant second documents, down to a single one, listing the second documents in a corresponding order, and so on) and they may be output in any way (for example, returned to a computing machine from which a corresponding search request has been received, displayed directly, triggering a corresponding action and so on).

Further embodiments provide additional advantageous features, which may however be omitted at all in a basic implementation.

In an embodiment, the method comprises selecting (by the computing system) at least one prevalent property among the properties according to the corresponding confidence indexes in the selected first descriptor. However, the prevalent properties may be in any number and they may be selected in any way (for example, the best property, the better properties in a predefined number, all the properties having their confidence indexes reaching a threshold, the best property and any other properties having their confidence indexes reaching a percentage of the confidence index of the best property, and so on).

In an embodiment, the method comprises filtering (by the computing system) the second documents to identify one or more candidate second documents thereof. However, the candidate second documents may be in any number and identified in any way (for example, all the ones satisfying a selection criterion, the best ones according to the selection criterion in a predefined number, the best one and any other ones satisfying the selection criterion at a level at least equal to a percentage with respect to the best document, and so on).

In an embodiment, the candidate second documents are identified according to a matching of the values of the prevalent property in the corresponding second descriptors with the value of the prevalent property in the selected first descriptor. However, the matching may be determined in any way (for example, when the values are the same or have a similarity higher than a threshold, indiscriminately or only when their confidence indexes in the second descriptors reach a threshold, and so on).

In an embodiment, the method comprises limiting (by the computing system) the ranking the second documents to the candidate second documents. However, the possibility is not excluded of applying the ranking indiscriminately to all the second documents.

In an embodiment, the method comprises limiting (by the computing system) the identifying the candidate second documents to the second documents having the confidence indexes of the prevalent property in the corresponding second descriptors reaching a filtering threshold. However, the filtering threshold may have any value (for example, in absolute terms, in terms relative to the confidence index of the prevalent property in the selected first descriptor and so on).

In an embodiment, the ranking the second documents comprises calculating (by the computing system) corresponding relevance indexes of the second documents with respect to the selected first document. However, the relevance indexes may be of any type (for example, continuous with any range, discrete with any levels and so on).

In the embodiment, the relevance indexes are calculated each according to a matching of the value of each of the properties in the corresponding second descriptor with the value of the property in the selected first descriptor weighted according to the corresponding confidence indexes. However, the matching may be determined in any way (for example, when the values are the same or have a similarity higher than a threshold, indiscriminately or only when their confidence indexes in the selected first descriptor and/or in the second descriptor reach a threshold, and so on) and it may be used in any way to calculate the relevance index (for example, by impacting or non-impacting the relevance index when they match or do not match, respectively, by modulating the impact on the relevance index according to a degree of matching, and so on); moreover, the relevance index may be weighted according to the confidence indexes in any way (for example, by increasing the relevance indexes according to their average, sum, product and so on).

In an embodiment, the ranking the second documents comprises ranking (by the computing system) the second documents according to the corresponding relevance indexes. However, the second documents may be ranked in any way according to the relevance indexes (for example, by selecting the second document having the highest relevance indexes, by ordering them accordingly, by listing the second documents with the corresponding relevance indexes, and so on).

In an embodiment, the method comprises limiting (by the computing system) the calculating the relevance indexes to the properties having the corresponding confidence indexes in the selected first descriptor reaching a comparison threshold. However, the comparison threshold may have any value (for example, in absolute terms, in terms relative to the confidence index of the prevalent property in the selected first descriptor and so on).

In an embodiment, the method comprises calculating (by the computing system) the relevance indexes each according to an average of the confidence indexes in the corresponding second descriptor and in the selected first descriptor for each of the properties having the corresponding value in the second descriptor matching the corresponding value in the selected first descriptor. However, the relevance index may be calculated in any way according to these averages (for example, linearly, non-linearly, according to their sum, product and so on).

In an embodiment, the second descriptors comprise corresponding effectiveness indexes of the corresponding second documents. However, the effectiveness indexes may be of any type (for example, continuous with any range, discrete with any levels and so on).

In an embodiment, the method comprises calculating (by the computing system) the relevance indexes further according to the corresponding effectiveness indexes. However, the relevance indexes may be calculated in any way according to the effectiveness indexes (for example, linearly, non-linearly, as adjusting factors, addends and so on).

In an embodiment, the method comprises receiving (by the computing system) an indication of corresponding effectiveness of at least part of the second documents to meet the selected first document. However, the effectiveness of each second document may be expressed in any way (for example, with continuous/discrete indicators, texts and so on) and it may be provided in any way (for example, entered manually, inferred automatically such as according to the time spent to read the second document, the number of further second documents opened after opening the second document and so on).

In an embodiment, the method comprises updating (by the computing system) the effectiveness indexes of the second documents according to the indication of the corresponding effectiveness. However, the effectiveness indexes may be updated in any way (for example, in a continuous/discrete way, linearly/non-linearly and so on).

In an embodiment, the one or more first documents are a plurality of first documents. However, the possibility of having a single first document is not excluded (for example, in interrogation applications and so on).

In an embodiment, the method comprises receiving, by the computing system, a selection of the selected first document among the first documents. However, this selection may be performed in any way (for example, directly, by a corresponding query and so on).

In an embodiment, the method comprises receiving (by the computing system) a query for searching the second documents. However, the query may be received in any way (for example, submitted remotely, locally and so on).

In an embodiment, the method comprises determining (by the computing system) the selected first document among the first documents according to the query. However, the selected first document may be determined according to the query in any way (for example, by applying the same solution described above, with a bag of words approach and so on).

In an embodiment, the method comprises identifying (by the computing system) the first documents and the second documents among a plurality of documents according to an identification criterion. However, the identification criterion may be of type (according to the nature of the first/second documents); the first/second documents may be identified in any way (for example, by analyzing their content, according to their origin and so on) or the documents may be provided already so partitioned.

In an embodiment, the first documents are indicative of corresponding problems and the second documents are indicative of corresponding solutions. However, the problems/solutions may be of any type (for example, relating to software, computers, smartphones, appliances, health, touristic destinations and so on).

In an embodiment, the method comprises receiving (by the computing system) an indication of the selected first document from a client machine over a telecommunication network. However, the client machine may be of any type (for example, a personal computer, a tablet, a smartphone and so) and it may communicate with the computing system over any telecommunication network (for example, a local, wide area, global, cellular or satellite network, exploiting any type of wired and/or wireless connections, and so on); moreover, the indication of the selected first document may be submitted in any way (for example, from a browser, a specific application and so on).

In an embodiment, the method comprises returning (by the computing system) the indication of the at least part of the second documents ordered according to the ranking to the client machine over the telecommunication network to cause a display thereof on a monitor of the client machine. However, this information may be of any type (for example, identifying the second documents by their URLs, names in a database, paths in a file system and so on); moreover, the second documents may be displayed in any way (for example, divided in pages or all together) and for any purpose (for example, browsing, downloading, reading and so on).

In an embodiment, the method comprises receiving (by the computing system) an indication of a selected second document among the at least part of the second documents from the client machine over the telecommunication network. However, the selected second document may be indicated in any way (for example, via its identifier, position in the ranking and so on).

In an embodiment, the method comprises uploading (by the computing system) the selected second document to the client machine over the telecommunication network. However, the selected second document may be uploaded in any way (for example, directly, by submitting a remote command and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a computing system to perform the above-mentioned method. An embodiment provides a computer program product, which comprises a computer readable storage medium that has program instructions embodied therewith; the program instructions are executable by a computing system to cause the computing system to perform the same method. However, the computer program may be implemented as a stand-alone module, as a plug-in for a pre-existing software application (for example, an asset reuse manager) or directly therein. Moreover, the computer program may be executed on any computing system (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means that are configured for performing the steps of the above-described method. An embodiment provides a system comprising a circuit (i.e., any hardware suitably configured, for example, by software) for performing each step of the above-described method. However, the system may comprise any number and type of computing machines (for example, of physical and/or virtual type) and it may have any architecture (stand-alone or distributed with the computing machines communicating among them via any network).

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for ranking documents, the method comprising:
   providing, by a computing system, one or more first documents of a first domain and a plurality of second documents of a second domain;
   generating, by the computing system, first descriptors of the one or more first documents and second descriptors of the second documents, wherein each of the first descriptors and each of the second descriptors comprise values of a plurality of properties and confidence indexes of the values;
   ranking, by the computing system, the second documents with respect to relevance thereof to a respective s one of the one or more first documents, based on comparing the second descriptors with a first descriptor corresponding to the respective one of the one or more first documents; and
   outputting, by the computing system, a result of ranking the second documents.

2. The computer-implemented method of claim 1, further comprising:
   selecting, by the computing system, at least one prevalent property among the properties, according to the confidence indexes in the first descriptor corresponding to the respective one of the one or more first documents;
   filtering, by the computing system, the second documents to identify one or more candidate second documents, according to matching of values of the prevalent property in the second descriptors with a value of the prevalent property in the first descriptor corresponding to the respective one of the one or more first documents; and
   limiting, by the computing system, the ranking the second documents to the one or more candidate second documents.

3. The computer-implemented method of claim 2, further comprising:
   limiting, by the computing system, identifying the one or more candidate second documents to the second documents having the confidence indexes of the prevalent property in the second descriptors reaching a filtering threshold.

4. The computer-implemented method of claim 1, wherein the ranking the second documents comprises:
   calculating, by the computing system, corresponding relevance indexes of the second documents with respect to the respective one of the one or more first documents each according to a matching of the value of each of the properties in a second descriptor with the value of a prevalent property in the first descriptor weighted according to the corresponding confidence indexes; and
   ranking, by the computing system, the second documents according to the corresponding relevance indexes.

5. The computer-implemented method of claim 4, further comprising:
   limiting, by the computing system, the calculating the corresponding relevance indexes to the properties having the confidence indexes in the first descriptor reaching a comparison threshold.

6. The computer-implemented method of claim 4, further comprising:
   calculating, by the computing system, the corresponding relevance indexes each according to an average of the confidence indexes in the corresponding second descriptor and in the first descriptor first descriptor for each of the properties having a corresponding value in the second descriptor matching a corresponding value in the first descriptor first descriptor corresponding to the respective one of the one or more first documents.

7. The computer-implemented method of claim 4, wherein the second descriptors comprise corresponding effectiveness indexes of the second documents, the method comprising:

calculating, by the computing system, the corresponding relevance indexes further according to the corresponding effectiveness indexes;

receiving, by the computing system, an indication of corresponding effectiveness of at least part of the second documents to meet the respective one of the one or more first documents; and updating, by the computing system, the corresponding effectiveness indexes of the second documents according to the indication of the corresponding effectiveness.

8. The computer-implemented method of claim 1, the method comprising:

receiving, by the computing system, a selection of the respective one of the one or more first document among the one or more first documents.

9. The computer-implemented method of claim 8, further comprising:

receiving, by the computing system, a query for searching the second documents; and determining, by the computing system, the respective one of the one or more first documents according to the query.

10. The computer-implemented method of claim 1, further comprising:

identifying, by the computing system, the one or more first documents and the second documents among a plurality of documents according to an identification criterion.

11. The computer-implemented method of claim 1, wherein the one or more first documents are problem documents describing problems, and the second documents are solution documents describing possible solutions to the problems.

12. The computer-implemented method of claim 1, further comprising:

receiving, by the computing system, an indication of the respective one of the one or more first document from a client machine over a telecommunication network; and returning, by the computing system, an indication of the at least part of the second documents ordered according to the ranking to the client machine over the telecommunication network to cause a display thereof on a monitor of the client machine.

13. The computer-implemented method of claim 12, further comprising:

receiving, by the computing system, an indication of a selected second document among the at least part of the second documents from the client machine over the telecommunication network; and uploading, by the computing system, the selected second document to the client machine over the telecommunication network.

14. A computer program product for ranking documents, the computer program product comprising one or more computer readable storage media having program instructions collectively stored on the one or more computer readable storage media, the program instructions readable by a computing system to cause the computing system to perform a method comprising:

providing, by a computing system, one or more first documents of a first domain and a plurality of second documents of a second domain;

generating, by the computing system, first descriptors of the one or more first documents and second descriptors of the second documents, wherein each of the first descriptors and each of the second descriptors comprise values of a plurality of properties and confidence indexes of the values;

ranking, by the computing system, the second documents with respect to relevance thereof to a respective one of the one or more first documents, based on comparing the second descriptors with a first descriptors a first descriptor corresponding to the respective one of the one or more first documents; and outputting, by the computing system, a result of ranking the second documents.

15. A computing system for ranking documents, wherein the computing system comprises:

a circuitry for providing one or more first documents of a first domain and a plurality of second documents of a second domain;

a circuitry for generating first descriptors of the one or more first documents and second descriptors of the second documents, wherein each of the first descriptors and each of the second descriptors comprise values of a plurality of properties and confidence indexes of the values;

a circuitry for ranking the second documents with respect to relevance thereof to a respective one of the one or more first documents, based on comparing the second descriptors with a first descriptors a first descriptor corresponding to the respective one of the one or more first documents; and a circuitry for outputting a result of ranking the second documents.

\* \* \* \* \*